US007424674B1

(12) United States Patent
Gross et al.

(10) Patent No.: US 7,424,674 B1
(45) Date of Patent: Sep. 9, 2008

(54) DOCUMENT DISTRIBUTION CONTROL SYSTEM AND METHOD BASED ON CONTENT

(76) Inventors: John N. Gross, 47 Big Tree Way, Woodside, CA (US) 94062; Anthony A. Gross, 320 Auburn Way #17, San Jose, CA (US) 95129

( * ) Notice: Subject to any disclaimer, the term of this patent is extended or adjusted under 35 U.S.C. 154(b) by 208 days.

(21) Appl. No.: 10/919,877

(22) Filed: Aug. 16, 2004

Related U.S. Application Data

(63) Continuation of application No. 10/723,370, filed on Nov. 26, 2003, and a continuation of application No. 09/014,414, filed on Jan. 27, 1998, now Pat. No. 6,782,510.

(51) Int. Cl.
*G06F 17/00* (2006.01)
(52) U.S. Cl. ............... 715/257; 715/255; 715/259; 709/203; 709/206
(58) Field of Classification Search ........... 715/533, 715/531, 500, 719, 535, 200, 234, 257, 262, 715/255, 259; 709/206, 203, 225; 707/5; 704/1
See application file for complete search history.

(56) References Cited

U.S. PATENT DOCUMENTS

| | | | |
|---|---|---|---|
| 4,456,973 A | | 6/1984 | Carlgren et al. |
| 4,674,065 A | | 6/1987 | Lange et al. |
| 4,773,039 A | * | 9/1988 | Zamora ............... 715/540 |
| 4,829,472 A | * | 5/1989 | McCourt et al. ......... 715/533 |
| 4,903,206 A | | 2/1990 | Itoh et al. |
| 5,258,909 A | | 11/1993 | Damerau et al. |
| 5,280,573 A | * | 1/1994 | Kuga et al. ............ 715/708 |
| 5,305,205 A | * | 4/1994 | Weber et al. ........... 715/531 |
| 5,349,648 A | * | 9/1994 | Handley ............... 715/517 |
| 5,367,453 A | | 11/1994 | Capps et al. |
| 5,418,718 A | * | 5/1995 | Lim et al. ............. 715/536 |
| 5,437,036 A | | 7/1995 | Stamps et al. |
| 5,576,755 A | * | 11/1996 | Davis et al. ............ 725/48 |
| 5,576,955 A | | 11/1996 | Newbold et al. |
| 5,594,642 A | * | 1/1997 | Collins et al. .......... 715/535 |
| 5,604,897 A | | 2/1997 | Travis |
| 5,619,648 A | | 4/1997 | Canale et al. |
| 5,623,600 A | | 4/1997 | Ji et al. |
| 5,649,222 A | | 7/1997 | Mogilevsky |
| 5,678,041 A | | 10/1997 | Baker et al. |
| 5,678,053 A | | 10/1997 | Anderson |
| 5,696,898 A | | 12/1997 | Baker et al. |
| 5,706,507 A | | 1/1998 | Schloss |
| 5,715,469 A | * | 2/1998 | Arning ............... 715/533 |

(Continued)

OTHER PUBLICATIONS

Camarda B., "Using Microsoft Word 97, Bestseller Edition", 1997, pp. 124, 126-127, 369-370, QUE.*

(Continued)

*Primary Examiner*—Doug Hutton
*Assistant Examiner*—James H. Blackwell
(74) *Attorney, Agent, or Firm*—J. Nicholas Gross

(57) ABSTRACT

A word processing tool is disclosed for checking the substance and not merely the spelling of words provided by a user. The word checker is capable of identifying potentially inappropriate word choices so that unintentional errors are not introduced into electronic text documents. The word checker can be implemented as a stand-alone procedure, or integrated into a conventional spell-checking program.

18 Claims, 3 Drawing Sheets

U.S. PATENT DOCUMENTS

| | | | |
|---|---|---|---|
| 5,751,335 A | | 5/1998 | Shintani |
| 5,757,417 A | * | 5/1998 | Aras et al. .................... 725/14 |
| 5,761,689 A | * | 6/1998 | Rayson et al. .............. 715/533 |
| 5,796,948 A | | 8/1998 | Cohen |
| 5,812,863 A | | 9/1998 | Ishikawa |
| 5,832,212 A | | 11/1998 | Cragun et al. |
| 5,835,722 A | | 11/1998 | Bradshaw et al. |
| 5,848,418 A | | 12/1998 | De Souza et al. |
| 5,875,443 A | * | 2/1999 | Nielsen ......................... 707/2 |
| 5,884,033 A | | 3/1999 | Duvall et al. |
| 5,889,943 A | | 3/1999 | Ji et al. |
| 5,890,182 A | | 3/1999 | Yagisawa et al. |
| 5,903,867 A | * | 5/1999 | Watari et al. ................ 704/270 |
| 5,907,839 A | | 5/1999 | Roth |
| 5,911,043 A | | 6/1999 | Duffy et al. |
| 5,933,531 A | * | 8/1999 | Lorie ......................... 382/229 |
| 5,956,739 A | | 9/1999 | Golding et al. |
| 5,960,080 A | | 9/1999 | Fahlman et al. |
| 5,973,683 A | | 10/1999 | Cragun et al. |
| 5,999,896 A | | 12/1999 | Richardson et al. |
| 5,999,932 A | | 12/1999 | Paul et al. |
| 6,023,723 A | | 2/2000 | McCormick et al. |
| 6,072,942 A | | 6/2000 | Stockwell et al. |
| 6,073,142 A | | 6/2000 | Geiger et al. |
| 6,075,550 A | * | 6/2000 | Lapierre ....................... 725/25 |
| 6,092,101 A | | 7/2000 | Birrell et al. |
| 6,166,780 A | | 12/2000 | Bray |
| 6,266,664 B1 | | 7/2001 | Russell-Falla et al. |
| 6,675,162 B1 | | 1/2004 | Russell-Falla et al. |

OTHER PUBLICATIONS

Camarda B., "Using Microsoft Word 97, Bestseller Edition," 1997, pp. 125, and 137-139, QUE Publishing.*

Schrader, A., "In Search of the Perfect Filter: Indexing Theory Implication for Internet Blocking and Rating Software," School of Library and Information Studies University of Albert, http://www.ualberta.ca/~aschrade/nl_cen2.htm, Jun. 1998.

Cyber Snoop Release, "Pearl Software Introduces Cyber Snoop Version 2.07," Nov. 3, 1997, pp. 1-2, http://www.pearlsw.com/psnews/cs_rel.htm.

Learning Company Press Release, "Learning Company's Cyber Patrol® Product Selected by Microsoft Corporation as Exclusive Filtering Technology for Internet Explorer Plus to Protect Children," Oct. 29, 1997, pp. 1-3, http://www.learningco.com/news/news/971029.htm.

Microsystems Press Release, "Microsystems Answers Parents' Demands with Cyber Patrol version 3.0," Jun. 5, 1996, pp. 1-4, http://www.cyberpatrol.com/cyber/patrol/cpnews/pr96/CP3_PR.htm.

AUP Auction Tools Press Release, Jun. 27, 1997, 1 Page, http://www.aupaction.com/pr0627.html.

Integralis, White Paper, MIMEsweeper, "Total Email Content Management Countering Email Bome Threats," www.mimesweeper.integralis.com, Jan. 1996, 12 pages.

Integralis, "MIMEsweeper Administrator's Guide," Functional Guide and Reference for MIMEsweeper Version 2.3, www.mimesweeper.integralis.com, 1996, 160 pages.

Schrader, A., "Consumer Protection or Censorship Technlogies?," Presented at 1997 annual conference of the Canadian Library Association, http://www.ualberta.ca/~aschrade/nl_cen2.htm, Jun. 1997, 26 pages.

* cited by examiner

DOCUMENT DISTRIBUTION CONTROL SYSTEM AND METHOD BASED ON CONTENT

CROSS REFERENCE TO RELATED APPLICATIONS

The present application claims priory to and is a continuation of Ser. No. 10/723,370 filed Nov. 26, 2003 and Ser. No. 09/014,414 filed Jan. 27, 1998, now U.S. Pat. No. 6,782,510 both of which are hereby incorporated by reference as if fully set forth herein.

FIELD OF THE INVENTION

The present invention relates to authoring tools that can be used in connection with contemporary word processing programs. In particular, the present invention provides an author of an electronically drafted document with a word checker that checks for and identifies inappropriate word choices in such document based on a sensitivity scheme of the user's choosing so that such words may be modified if necessary.

BACKGROUND OF THE INVENTION

The prior art is replete with word processing programs, including a couple of contemporary favorites, Microsoft WORD and Novell's Wordperfect, that are used by a substantial portion of IBM-compatible computer users. These programs are used in known ways for permitting authors to create electronic text (and graphics) documents. As a part of such word processing program, a spell-checking routine is almost always included to help authors reduce the number of unintentional text errors in such documents. A number of prior art patents are directed to this feature, and a reasonable background of the same is described in U.S. Pat. Nos. 5,604,897 to Travis and 5,649,222 to Mogilevsky, both of which are hereby incorporated by reference.

It is apparent, however, that spell-checking routines associated with such word processing programs have a number of limitations. Key among these is the fact that they cannot determine whether a particular word choice, while accurately spelled, is nevertheless perhaps inappropriate for the particular context within a particular document. As an example, many words that may be intended by a drafter (such as the words "ask," "suit," "public," etc.) can be transformed into potentially offensive words merely by changing a single letter in such words, transposing a few letters, or by mistakenly adding or dropping a letter. These transformed words, however, will still pass the spell-checking facility, because many of them include even a number of offensive words as part of their standard dictionary. For example, the word "ask" may be inadvertently written as "ass," and unless the message is intended to discuss issues pertaining to certain members of the animal kingdom, it is likely to be an inappropriate word choice. If these inadvertent mistakes are not caught by the drafter during a later review, they will be included in such document and potentially communicated to one or more third parties. Depending on the severity of the mistake, the receiving audience, and the scope of the distribution of the document, the consequences may range from minor embarassment to substantial financial loss from lost future business with such third party.

The possibility of such errors is increasing each day because of a number of driving factors, including the fact that standard dictionaries for word processors are growing in size to accommodate the largest number of words of course in a particular language. While one solution may be to not include such words in an electronic dictionary in the first place, this result makes the creation of such dictionaries more complicated because an initial censoring must be done before the words are even translated into electronic form. Moreover, this solution does not help the user to identify inappropriate words that may be skipped over during a spell-checking routine.

Another factor leading to increase in electronic word choice errors is the fact that many electronic documents are never reduced to a physical form before being disseminated. In many instances a glaring error is caught by a human inspection of a printed page before it is sent out. The so-called "paperless office" while improving efficiency and reducing waste also naturally causes a larger number of inadvertent message errors in text documents. Additional errors can even be induced by spell-checkers because when they detect a mis-spelled word, they will often provide a menu of potential word choices as replacements, and it is remarkably easy to select an inappropriate word choice from such menu, again merely by accident. Such errors of course will not be detected because the document is erroneously considered to be "safe" by many users after spell-checking has completed and they will not check it again. In other words, some facility for checking the spell-checker dynamically is also desirable, but does not exist at this time.

There is some facility in the prior art for permitting users to create so-called "exclusion" dictionaries for analyzing text documents. An example of such kind of system is illustrated in U.S. Pat. No. 5,437,036 to Stamps et. al. which is incorporated by reference herein. A drawback of this approach, however, lies in the fact that it requires the user to both divine and manually input all the potential mis-spellings that could occur, and even if they had the time, there are obviously an endless variety that might never be considered by such user. For example, a user may not have the foresight to notice that a simple transposing of two characters (a common error) may generate a word that is extremely offensive. Furthermore Stamps et. al. do not appear to contemplate the possibility that the act of rendering a document "spelling" error free may itself generate unintended word selection errors. As such, therefore, Stamps et. al. is not truly a "word" checker, but, rather, an enhanced spell checker that has been sensitized to a particular user's poor spelling habits. While it incidentally determines whether a word is perhaps not the intended choice of the author (i.e., that the word does not have a particular meaning), it does not perform the important step of determining the precise meaning of the word, and in particular whether the word also has a potentially inappropriate meaning as well.

A few methods for proof-reading electronic documents are also known in the art. A U.S. Pat. No. 4,674,065 to Lange et. al., also incorporated by reference herein, describes a technique for detecting word context errors in a document. This technique seems limited to homophones however (for example, it knows to see if a user intended to use the word "course" instead of "coarse") and is not generally applicable to the problem of determining inappropriate use of language in documents. For example, unless a particularly offensive word has a homonym, Lange et. al. would not even detect such word as being a problem. The approach of Lange et. al. further requires a fair amount of computational complexity, since it must analyze the text preceeding and following after a word and use a complicates set of syntax rules to determine whether the word is being used in context correctly. This fact alone makes it essentially unusable for most contemporary word processing programs which utilize background spell checking, dynamic spell-checking, etc.

Finally, a U.S. Pat. No. 4,456,973 to Cargren et al., and also incorporated by reference herein, discusses the use of an electronic word dictionary that has an associated code field for indicating the level of comprehensibility of such word. For example, the word "abandon" is coded with a numerical designation 6, indicating that the word is probably understandable by children at the $6^{th}$ grade level. Cargren et al., however, do not appear to address the more general problem of identifying text that has been inadvertently mis-spelled by an author, and which is likely to be inappropriate. In other words, the Cargren al. approach presumes that the user has correctly input the word in question, and unless the word is coded with a rating below that of the intended grade group of children, it is not flagged in anyway. It is apparent that this method of encoding is fairly impractical for use in an electronic dictionary intended to be used by an adult population, because adults are not classified in this way. In fact, if a target audience of a document is intended to be primarily adults, then the Carlgren et al. approach would not flag any words at all, because they would probably be presumed to be operating at the highest level of education (12), thus rendering this type of filtering essentially useless. In addition, there is no facility mentioned by Cargren et al. for detecting words that are likely to be offensive, even if consciously selected by the author. For example, the use of the word "dame" may be consciously selected but nevertheless undesirable in communications in which the intended audience is primarily adult women. A drafter of an electronic document may desire to be notified of such potentially offensive words if they are known to be sensitive.

SUMMARY OF THE INVENTION

An object of the present invention therefore is to reduce the number of unintentional inappropriate word choices within electronic documents that would otherwise go unnoticed using conventional word processing-document checking tools so as to improve the integrity and accuracy of such documents;

Another object of the present invention is to provide a system and method that is easily and seamlessly integratable into conventional word processing document checking tools so as to enhance the performance of such tools;

A related object of the present invention is to provide a system and method for filtering and verifying the contents of one or more electronic documents to determine the presence of potentially inappropriate and unintended word choices;

Yet a further object of the present invention is to reduce the number of intentional but unknowingly inappropriate word choices within electronic documents that would otherwise go unnoticed using conventional word processing document checking tools;

A related object is to improve the performance of present day word processing document checking tools by providing an additional verification tool that confirms the appropriateness of the selections made by such prior art checking tools;

Another object of the present invention is to permit a user of a word processing program to selectively control the level of sensitivity to be used for determining whether words in an electronic document are potentially inappropriate;

Still another object of the present invention is to'permit an author of an electronic document to have the words of such document analyzed and processed by a number of context filters of the author's choosing to reduce the number of potential inappropriate words in such document.

These and other objects are achieved by the present invention which includes a word checking software routine (implementable as a stand-alone program or integrated with a conventional spell checker) that checks the meaning of words in an electronic document authored by a user. When word-checking for the document is desired by the user, the words from the document are retrieved one at time, and checked against entries in an electronic dictionary to determine whether they have a particular meaning that has been designated as potentially inappropriate for use in a text document. The determination is made based on comparing a threshold sensitivity level (which can be controlled by the user) with an appropriateness rating found in one or more status fields associated with the word. If the word in question has a rating higher than the threshold set by the user, an alert is provided to indicate such result.

In another embodiment, multiple status fields are used. The status fields can be used essentially as multiple context filters for assisting an author in reducing the number of potentially inappropriate words as they may be conveyed to multiple intended audiences. The ratings for the words in any of the status fields can have any range of values and are preferably coded at the time the words are placed into the electronic dictionary. They can also be modified by the user, later, if desired.

The present invention is completely integratable with a conventional spell-checking program, so that the spelling of a word can also be analyzed before its meaning is also checked. When a mis-spelled word is found, a user can select from a list of accurately spelled substitute words instead, but such substitute word is also checked to see if has a meaning that is potentially inappropriate for use in a text document.

Another variation of the present invention permits a user to specify a set of documents to word-check, and to generate an output indicating the results of such check.

In yet another embodiment, the meaning of the words in the document are checked during an idle state of the word processing program, so that the operation of checking the entire document at the user's request at a later time can be reduced in time because it will already have been partially completed.

To further reduce errors, another embodiment of the present invention checks the meanings of words substantially immediate in time after they are input into the document by the user. This can ensure that a potential word problem is in fact brought to the user's attention automatically and without the need for a further command from the user.

The electronic dictionary used in the present invention includes a series of records corresponding to words and their associated status field values. The data for these records are input in electronic form to create a set of words in computer readable form for the dictionary, along with status fields associated for each of such words. Again, as mentioned above, the status fields indicate whether such word has a meaning that is potentially inappropriate for use in a particular context. As the dictionary is constituted, any number of status fields can be used to correspond to different sensitivity ratings for different target audiences.

The present invention can be included within a word checking software module that is itself embodied and transferred in computer readable form, such as a floppy disk, a hard disk, a CD-ROM, a magnetic tape, or a non-volatile semiconductor memory. In this way, a new type of computer system is effectuated which permits an author to perform a word checking operation on an electronic text document generated by a conventional word processing program running on such system.

DETAILED DESCRIPTION OF THE INVENTION

Figure 1:
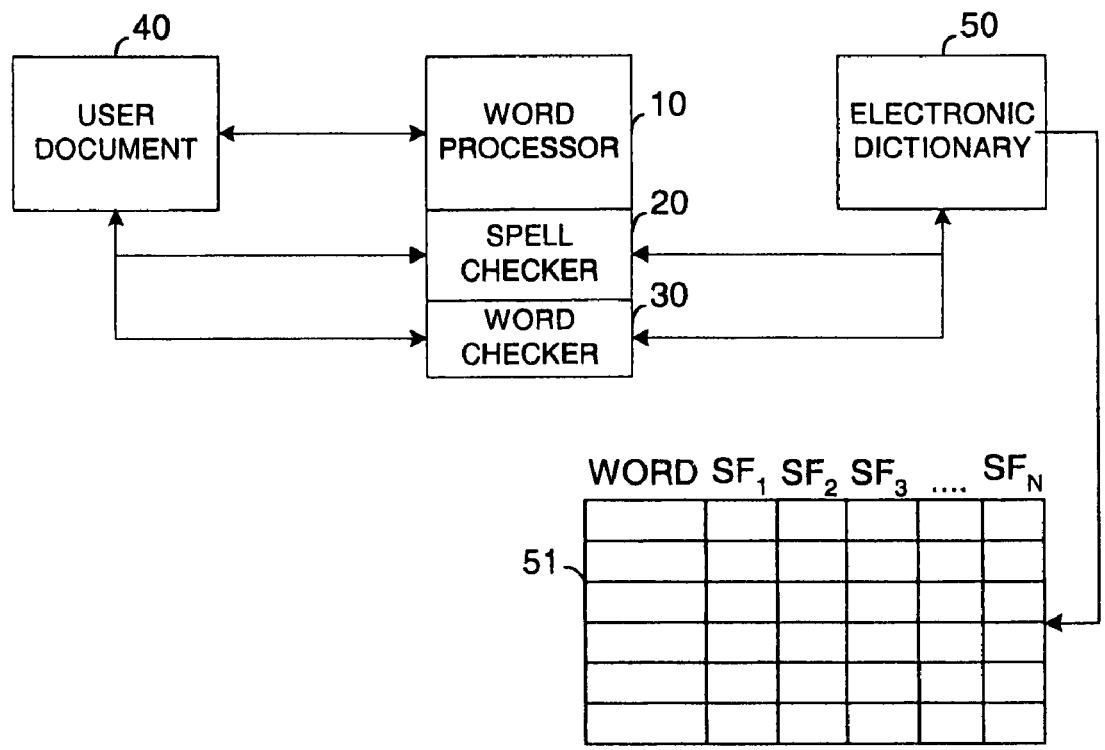
FIG. 1 is a simplified block diagram of a word processing system embodying the teachings of the present invention.

FIG. 1 illustrates a physical implementation of a preferred embodiment of a system employing the present invention. A user can interact with a word processing program 10 loaded in a system memory of a conventional computing system, such as a personal computer. Such programs typically include a spell checking routine or module 20, broken out visually in the present figure for clarification. The inventive routine of the present invention is also illustrated as word checker routine or module 30.

Both spell checking routine 20 and word checker routine 30 have access to and can store/retrieve entries from a standard electronic dictionary 50, which, again, is well-known in the art. It is understood, of course that spell checking routine 20 and word checker routine 30 may be embedded as one software module of word processing program 10, or alternatively, may be constituted as separate programs that interacts with program 10 and each other. Those skilled in the art will appreciate that a number of separate modules (i.e., for controlling printing, document loading, etc.) of word processing program 10 are not shown, but they are not material to the teachings of the present invention. A document 40 is also shown, and this item can be generated and controlled by a user using word processing program 10 in a conventional manner well-known in the art.

Again, while the present illustration depicts the various routines, documents and dictionaries as separate entities, it is understood that this is a simplified description intended to convey the key concepts of the present invention. During normal operation of word processing program 10 these various entities are typically loaded from a non-volatile memory storage device (such as a magnetic hard disk) and then coexist in a physical and logical sense within the same system memory.

Figure 2:
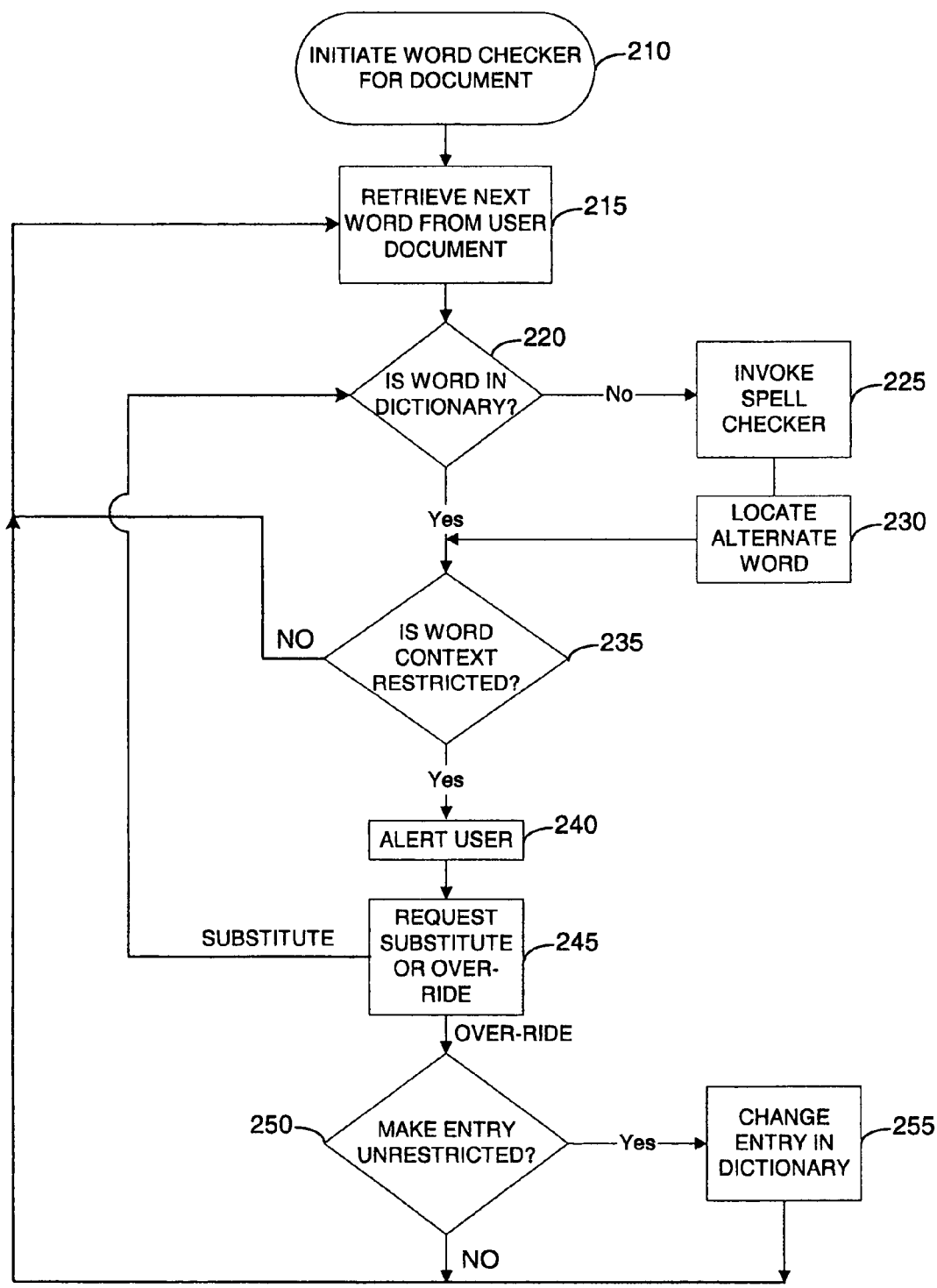
FIG. 2 is a flow chart illustrating the operation of a document word checking tool implemented in accordance with the teachings of the present invention.

A flowchart of the operation of a preferred embodiment of the present invention is depicted in FIG. 2. When word checker routine 30 is invoked at step 210, it begins to retrieve and analyse words from document 40 in a manner well-known in the art from similar techniques used in conventional spell-checkers. In one variation spell checker routine 20 and word checker routine 30 are "integrated" in the sense that they are invoked together and inter-operate with each other. In this variation, the word from the document is first spell-checked in the manner known in the prior art. For example, if the word is not found in electronic dictionary 50 at step 220, spell checker routine 20 is invoked at 225. Again, using conventional techniques, a set of suitable alternative words are presented to a user at step 230 as replacements for the unidentified word.

At this point the method of the present invention is not different in any material fashion from prior art spelling programs. At step 235, however, a substantial difference is found in the fact that the present invention does not blindly permit the user to select one of the alternatives presented at step 230. As mentioned above, there is a non-insignificant chance of error presented when large lists of words are presented to users during spell-checking routines. It is altogether too easy to select the wrong word, and worse yet, a very inappropriate word. For this reason, at step 235, the word selected by the user is also checked to see if it is flagged as potentially context restricted. In this manner, errors are further reduced, and an additional level of accuracy is achieved.

In one implementation the information concerning a rating of the restricted status for the word can be stored in an electronic field associated with a record for such word in a dictionary database, as shown in the breakout of the diagram for dictionary 50. Each entry 51 in dictionary 50 includes a word and one or more associated status fields ($SF_1$, $SF_2$ ... $SF_n$), which, in its simplest form, can be a single bit field that is either set or not set, depending on whether the word has been previously designated as potentially inappropriate. This status bit can be set either during the creation of dictionary 50, or at the request of a user later on, much in the same way new words can be added to auxiliary or supplemental dictionaries used in conventional spell-checking programs.

In another embodiment, status field $SF_1$ can be allocated sufficient coding bits so that it may have any one of N possible values, where N represents a rating indicating a relative ranking of inappropriateness. This feature allows a degree of grading the words of a vocabulary in shades of grey so to speak, and permits more precise control by the user of the level of inappropriateness that can be tolerated within any particular document. For example, using a scale from 1-10, words that are known and commonly used in a vulgar or offensive fashion can be given a 10 value rating, while words that are commonly understood in only harmless contexts can be given a 1 rating. Other words that are not as fixed in meaning or easily classifiable can be given value ratings in between this range, again, depending on their common usage within a particular target audience. Associated status fields $SF_1$, $SF_2$, etc., can be used to generate different and unique sets of inappropriate words for different intended recipient groups. While only three status fields are shown to simplify the present discussion, it is understood that any number may be used in connection with an electronic dictionary. For instance, the ratings found in field $SF_1$ can be based on word meanings for a typical U.S. based English speaking audience, while $SF_2$ might be used to indicate the rating for the same word for a different target audience (i.e., a different language speaking group, a different geographic group within the same country, or an audience with specific sensitivities to certain types of words). The ratings for status fields $SF_1$, $SF_2$, $SF_3$ may be derived from survey results, from polling the intended audience populations, from analyzing other published literature materials for such intended groups, from organizations specializing in advertising and marketing, etc.

One advantage of the present invention over the prior art lies in the fact that the ratings of dictionary words 51 can be pre-programmed, instead of requiring a user to inspect each entry and designate the status manually. It is expected that such ratings could be generated by persons skilled in the art of contemporary language usage, or persons having particular knowledge or understanding of terminology used in specific fields, or by specific target audience groups, using some of the reference materials (e.g. surveys and the like) described immediately above. The words and associated ratings can be put into computer readable form at the time of the creation of the dictionary by the vendor of word processing program 10, or by a supplier of dictionary 50 using a conventional database structure with accessible records or the like.

It is equally feasible, of course, that an entirely separate electronic dictionary 50' may be designated instead for potentially context restricted words. In this kind of approach step 235 merely checks such separate dictionary 50' to see if the word has been included in the class of potentially inappropriate words. In any event, a number of implementations may be employed for designating potentially offensive words and the present invention is not limited to any of the examples shown herein.

In the event the present invention is not embodied in a routine that runs concurrently with spell checker routine 20, it is apparent that steps 220, 225 and 230 would not occur. In other words, in a stand-alone implementation where word checker routine 30 is invoked as another typical word processing tool within document 40, the present routine progresses directly from step 215 to step 235 where the word is checked. The key aspect of the present invention lies in the fact that the meaning or substance of words, not simply the spelling of such words, are determined and verified. In a preferred embodiment, a user of word processing program 10 is able to control both: (1) the range of status fields $SF_1$, $SF_2$, etc. to be checked, as well as (2) a threshold level value for such field that should be used in determining whether a particular word should be flagged. These control mechanisms for the user can take the form of menu choices implemented in well-known fashion in typical contemporary spell-checking programs. In this manner, a particular user document 40 can be subjected to a variety of language "filters" and with varying levels of sensitivity to provide additional functionality and benefits. For example, some U.S. companies doing business in foreign countries nevertheless communicate and advertise in English to the local population, because of the ever increasing English fluency of such countries. Documents intended for such audiences can be subjected to filtering not only for English words that are deemed inappropriate by U.S. citizens, but also which have a negative meaning when transliterated into the language of the country in question. Other users may find it useful to designate one status field simply as a filter for those words that they know are prone to over-use or misuse to increase their writing clarity and proficiency. Accordingly, a user of word processing program 10 can decide to utilize any one or more of such filters in connection with the word checking of document 40, and the selection of such filters can be accomplished in any one of several known ways (i.e., highlighting desired filters presented in the form of a list, specifying them by name, etc.) In addition, the user can also determine (if desired) the threshold level of sensitivity to be used during the checking of words in document 40. In other words, when a particular status field $SF_1$ can have a value ranging from 1 to 10, the user can specifically indicate that only words having a status field value in excess of 8 should be considered as potentially inappropriate.

In one sense, the present invention behaves as a superior spell-checker, because it catches even correctly spelled words that are nonetheless incorrect (from the user's intent perspective) because they are based on other words inadvertently mis-spelled originally by the user. In other words, the user had a word with spelling "xyzzy" in mind, but this word was inadvertently input as "xyyzy." If "xyyzy" (the transformed embodiment of "xyzzy") is nevertheless a word in a spell-checking dictionary, the prior art techniques will never detect this mistake as a true error, even though it is undesirable from the user's perspective, and perhaps worse, may lead to significant embarrassment if undetected. By permitting a user to designate sets of words that should be screened (even if correctly spelled) the present invention affords a significantly higher level of confidence to the user that documents will be generated error and embarrassment free. This kind of tool is especially helpful because of the fact that electronic communications occur in rapid fashion, and dissemination of electronic documents can take place with little chance or opportunity for correcting mistakes.

In any event, should a match occur for the word in question indicating that it falls within the parameters of the user's specification for what should be flagged as an inappropriate word, an alert is given to the user at step 240. The alert can take the form of highlighting the word in the text of the document with an accompanying warning that can be either visual, audible or both. The alert can also indicate the identity of the filter that was triggered by the word when more than one status field is used during the word checking process. Again, the precise implementation of the warning is not critical, and any one of many known methods in the art can be used.

At this point, the user can decide at step 245 whether the word is truly inappropriate, and if so, the user can provide a substitute word, or override the program to keep the word as is. The substitute word can be provided directly by the user, or a set of suitable alternatives can be presented in the same way conventional spell checking program 20 provides users with such lists. Again, this substitute selection is nevertheless also inspected and verified for its appopriateness by virtue of the fact that the routine branches back to setp 220. In this manner, the potential for erroneous inclusion of offensive or inappropriate language is further minimized.

In the event the user decides to stick with the word, an option can be presented to the user at step 250 for reducing the value of the status field for the word so that it will not be identified as a potentially inappropriate word during a subsequent check (unless a lower threshold is used of course). This might be desirable, for example, in certain fields of use where ostensibly inappropriate words may be nevertheless otherwise acceptable for use in common communications. At step 255, therefore, a user can modify the status of the word in dictionary 50 or 50' as the case may be.

Those skilled in the art will appreciate that the present invention can be used in a number of environments where documents are electronically drafted and have electronic text, including with spreadsheet programs, database programs, e-mail programs, etc. Many of these programs have spell-checking capabilities built in, and the present invention can piggy-back directly on such capability.

Figure 3:
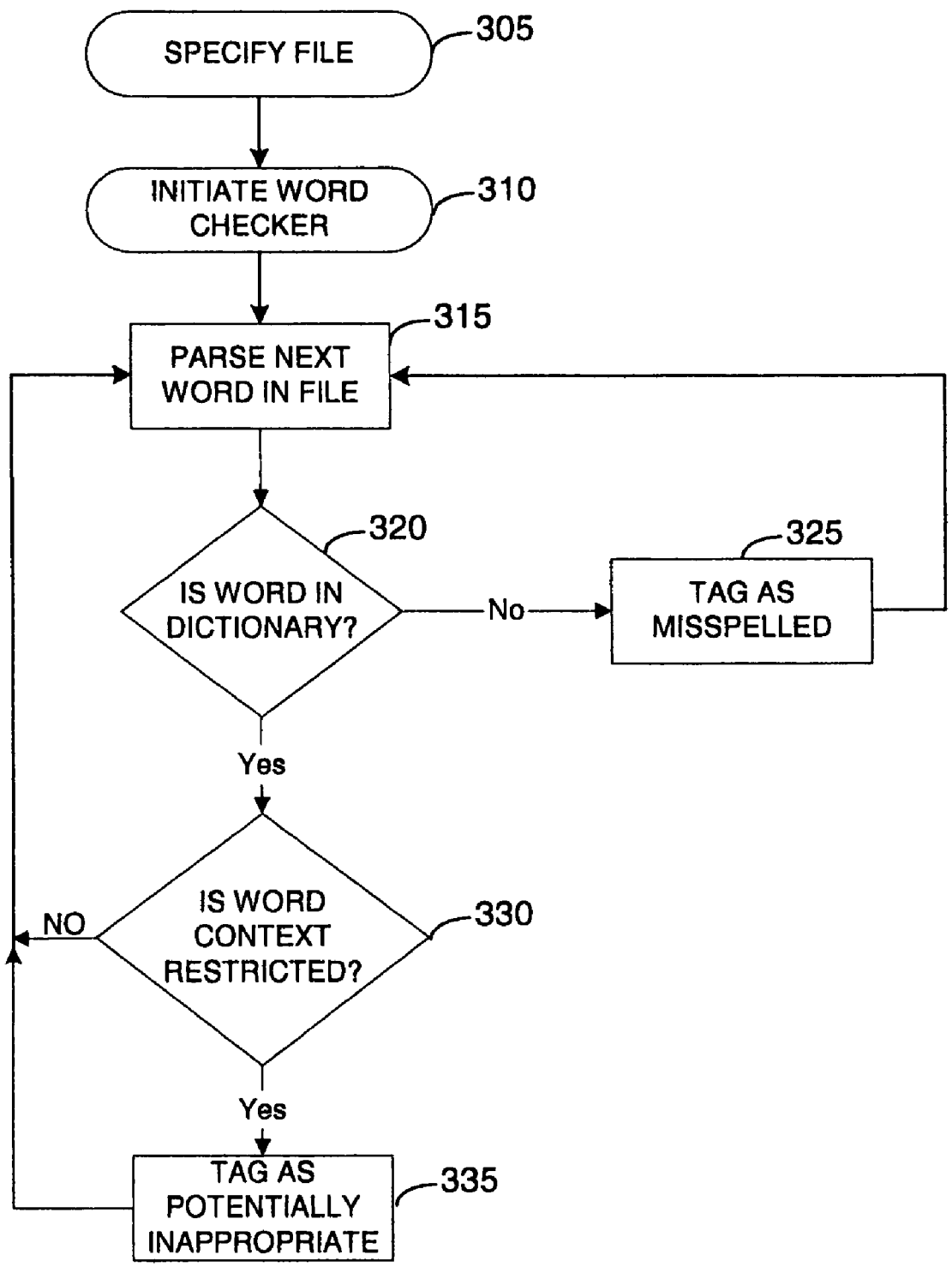
FIG. 3 is a flow chart illustrating a variation of the present invention adapted for checking words in a number of electronic documents specified by a user.

Moreover the present invention can be used for batch inspection and verification of electronic documents, as shown in FIG. 3. Instead of working directly with an open document 40, for example, an electronic file to be word checked can instead be specified at step 305 by a user. This type of capability is common in word-processing programs 10 today, and permits a user to select a number of files that are to undergo a particular operation without opening them. For example, from the FILE OPEN pulldown option in WORDPERFECT, a print operation can be effectuated on a user specified list of files. In this same way, the present invention as embodied in a word checker routine 30 can operate on a number of files at shown at step 310. As each word is parsed at step 315, an optional spell checking routine 320 first determines if there is mis-spelling of such word, and, if so, tags the word as such at step 325. If the word is otherwise identifiable because it is in dictionary 50 or alternate dictionary 50', it is context checked at step 330 in the manner described above and with the same degree of available control by the user. Each word identified as potentially inappropriate is flagged and tagged at step 335 before the routine returns to process the next word. At the end of the file word checking operation, a list of mis-spelled words and identified potentially misappropriate words is generated for the user's review. This list can be displayed visually, generated as a text file, etc. so the user can determine whether there are potential problems in disseminating such electronic files, and, take corrective action if necessary.

It will be apparent to those skilled in the art that the present invention can be implemented using any one of many known programming languages such as C, C++, Pascal, etc. The details of the specific implementation of the present word checker will vary depending on the programming language used to embody the above principles. Furthermore, while the present discussion has revolved around IBM compatible machines it is equally clear that the present invention is not limited to such environments and can be used with Apple compatible machines, or for that matter with any machine that includes a word processor, including personal digital assistants and similar portable computing devices.

Yet another variation of the present invention makes use of a concept disclosed in the Mogilevsky reference discussed above. In this manifestation, spell checking routine 20 and word checker routine 30 (whether integrated or standalone) can be implemented in a well-known fashion that improves performance by having them operate while there is no interaction going on between the user and word processing program 10. In other words, the routine can take advantage of otherwise idle time by checking the document and other open documents if the user is not actively engaged in an operation requiring immediate attention by word processing program 10. It is apparent that such variations of the present invention could be beneficial in a number of environments.

Another useful variation of the present invention can be implemented to take advantage of another well-known concept in the art, and that is the use of "dynamic" text checking. For example, the Travis reference above explains how words can be spell-checked on the fly, i.e., as the user is typing in many conventional word processing programs. This feature permits a user to enter a word, and then have it checked while he or she is still typing, and while their attention is still focused on the document. The spell checking routine 20 automatically substitutes the closest choice it finds for commonly misspelled words; for example, the type word "teh" is, changed rapidly to "the" while the user is perhaps still entering text. In a similar vein, a dynamic word-checking feature can be implemented, and it will be apparent to those skilled in the art that this approach is merely a variation of the procedure described in FIG. 2, except that the words retrieved at step 215, are fetched in a background task which is runming even while the user is engaged in normal text entry, editing, etc. From the user's perspective, the word-checker routine 30 merely appears as an add-on verification tool feature to spell-checker 20, with additional functionality and benefits for reducing document errors. To minimize errors, the result of the word-check is communicated as quickly as possible to the user, subject to system performance limitations of course. In any event, with typical computing devices it is expected that such result can be communicated before the user has finished completing data entry of another word that must be checked as well. In some application environments it may be desirable to disable further data input once it has been determined that a potentially inappropriate word has just been entered.

One environment where the dynamic variation is especially useful in e-mail systems where people rarely spell-check a text message after it is composed. Accordingly, the ability to identify and alert users automatically of potential errors is particularly helpful in this area.

In a general sense the present invention can be seen as a useful tool for not only reducing unintentional errors in electronic text documents, but also some intentional errors that are not necessarily understood or appreciated by the user of a word processing program 20. In other words, a word input by a user may be classified by in an number of ways including: (1) an intentional selection that is appropriate; (2) an intentional selection that is inappropriate; (3) an unintentional selection that is inappropriate; or (4) an unintentional selection that is appropriate (in the sense that it is perhaps non-offensive even if it is inapposite for the context). Of these classifications, it is clear that the first category (1) do not require any remedial action. It is equally clear that the category (4) mistakes are perhaps undesirable, but are not easily identifiable, and the computational complexity involved in doing so may not be worthwhile. For example, a sentence that reads "I gave my him jacket" instead of "I gave him my jacket" is not accurate but is not offensive.

The present invention, however, is a simple, fast and cost-effective tool that can be used to easily identify the category (2) and (3) errors above. For the category (3) items, it is a rather simple matter as described above to identify and classify entries in an electronic dictionary with varying status field values reflecting their common usage in a particular context. Any number of potentially offensive, crude, vulgar, obscene or inappropriate words are included in an electronic dictionary for the sake of completeness (and for ease of integration from text to electronic form) but it is rarely the case that they are desired to be used in communication and they can be identified by setting the associated status field to a high value. The category (2) items are somewhat more subtle, but it is apparent that some words, even if consciously selected, may nevertheless be inappropriate because of a number of cultural considerations, or simply because they are generally misused by the general population of authors. As an example, a considerable amount of attention has been focussed recently in the U.S. on eliminating gender specific vocabulary except where absolutely necessary. A business entity attempting to sell products or services to a primarily female based clientele may benefit from a word checking tool that is sensitive to potential gender issues raised by language found in documents intended to be communicated to such clientele to reduce the possibility of an mis-communication. Many ethnic groups have particular words or phrases that are considered inappropriate or offensive by them, even if they otherwise understood as inoffensive by other groups. For example, Chevrolet automobiles designated "NOVA" did not sell well in Latin American countries, because the term as translated into Spanish means "does not go." In addition, many foreigners attempting to write in English often confuse homonyms and substitute the wrong word choice (for example, weather and whether). Similar examples from other fields will be apparent to those skilled in the art. For any such areas, it would be an easy task for a person skilled in the field of contemporary language and familiar with such potentially offensive vocabulary in such specific area to flag such entries in electronic dictionary 50 by using one of the associated status fields ($SF_1$, $SF_2$, $SF_n$, etc.), and/or to assemble and create a separate customized electronic dictionary of words that potentially implicate inappropriate language for a particular audience. These dictionaries could supplement traditional electronic dictionary 50 and be invoked as needed by a user of word processing program 10, so that any one or more of a number of word checking verifications or document filtrations could be performed depending on the target audience intended to receive such document. Such additional dictionaries, or additional status field values for a particular filter, could be created in a number of ways, including as additional incorporations in the original dictionary 50, or by the vendor or user of word processing program 10 modifying dictionary 50 at a later time.

Finally, word processing program 10, spell-checking program 20 and word-checking program 30 described above can be embodied in well-known ways in an article of manufacture such as in traditional computer-readable media commonly used to transport such programs. These can include a floppy disk, tape, hard disk, CD-ROM or equivalent non-volatile storage system. In this format, they can be transported easily and loaded via a host computer into system memory for execution. Alternatively in smaller, self-contained environments, such as personal digital assistants, the above routines can be implemented as part of a non-volatile storage portion of a stand-alone integrated circuit, or embedded as part of a non-volatile storage structure in an architecture of a typical microprocessor or RISC processor. The instructions for carrying out such routines can be encoded or implemented in a silicon substrate as is done with other program ROMs, and using conventional manufacturing techniques.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the appended claims.

What is claimed is:

1. A method of permitting a user to simultaneously check both the spelling and meaning of words in an electronic document within a computing system comprising the steps of:
    providing a spell checking routine operating on the computing system;
    providing a word checking routine operating on the computing system;
    retrieving a word to be spell checked and word checked from said electronic document; and
    determining whether said word has been spelled correctly using said spell checking routine and a first dictionary; and
    when said word has been spelled incorrectly, presenting a first list of alternative words to said user as replacements for said word, and permitting said user to select a first replacement word for said word; and
    determining whether the meaning of said word or said first replacement word has been designated as potentially inappropriate for use in said electronic document by using said word checking routine and a second context dictionary;
    wherein said second context dictionary includes a plurality of separate language dictionaries, each said language dictionary being independently selectable within said word checking routine for said document and further containing words identified as potentially offensive and/or inappropriate for a separate corresponding target audience; and
    when said word or said first replacement word has been designated as potentially inappropriate, presenting a second list of alternative words to said user as replacements for said word or said first replacement word, and permitting said user to select a second replacement word for said word or said first replacement word prior to transmitting said electronic document to a third party;
    wherein said word or said first replacement word has a first meaning in a first context specified in a first language dictionary within the word checking routine, and a second meaning in a second context specified in a second language dictionary within the word checking routine, and said method further includes a step of determining with said word checking routine whether said word or said first replacement word has a particular meaning that has been designated as potentially inappropriate for use in either of the first or second contexts.

2. The method of claim 1, further including a step of designating words that have a meaning that is potentially inappropriate by changing a value of a status field for such words in said first or second context dictionaries.

3. The method of claim 2, wherein the status field for each of the designated words can have one of N values, where N>2.

4. The method of claim 2, further including a step of specifying a threshold value which the status field must exceed in order for said designated word to be identified as potentially inappropriate.

5. The method of claim 1, further including a step of generating an alert indicating that said electronic document includes a word that is potentially inappropriate.

6. The method of claim 1, wherein said word is checked substantially immediate in time after it is input into said document by a user.

7. The method of claim 1, wherein said plurality of separate language dictionaries are predefined in advance without input by the user.

8. The method of claim 1, wherein the user can configure different thresholds for different ones of said plurality of separate language dictionaries, wherein said different thresholds are used to determine if said identified words are potentially inappropriate.

9. The method of claim 1, wherein said plurality of separate language dictionaries include at least one customizable dictionary which can be changed by a business entity.

10. The method of claim 1, wherein said plurality of separate language dictionaries include at least one non-English dictionary.

11. The method of claim 1, further including a step: checking a second document with different ones of said plurality of separate language dictionaries after checking said document.

12. The method of claim 1, wherein the computing system is part of a personal digital assistant and said context dictionary is stored within a non-volatile memory.

13. The method of claim 1, wherein a checking routine executed by the computing system is implemented as firmware within an integrated circuit.

14. The method of claim 1, wherein the computing system is configured to check all emails generated by users within a business entity for inappropriate content before they are distributed to respective recipients.

15. The method of claim 14, wherein said emails are associated with products or services offered by said business entity.

16. The method of claim 1, wherein said plurality of separate language dictionaries include at least one customizable dictionary which can be changed by a business entity selling said products and/or services to include additional words inappropriate for a target audience.

17. The method of claim 1, wherein said plurality of separate language dictionaries include at least one customizable dictionary containing gender specific inappropriate words.

18. The method of claim 1, wherein said plurality of separate language dictionaries include at least one customizable dictionary containing inappropriate racist words.

* * * * *